2,789,971

POLYCARBONATES FROM 4,4'-BIS(β-HYDROXY-ETHYL)-BIPHENYL-BIS (ALKYL OR ARYL CARBONATES)

Delbert D. Reynolds and Kenneth R. Dunham, Rochester, N. Y., assignors to Eastman Kodak Company, Rochester, N. Y., a corporation of New Jersey No Drawing. Application December 8, 1953, Serial No. 397,038

17 Claims. (Cl. 260—77.5)

This invention relates to highly polymeric linear polycarbonates prepared by the self-condensation in the presence of an ester-interchange catalyst of a 4,4'-bis(β-hydroxyethyl)biphenyl-bis-(alkyl or aryl carbonate). These starting materials are hereinafter referred to as bis-(carbonate) monomers. This invention also includes polycarbonates prepared by condensing mixtures of these bis-(carbonate) monomers. Furthermore this invention relates to the processes involved in preparing the monomers and polymers.

It is an object of this invention to provide unexpectedly and unusually superior highly polymeric linear polycarbonates which are valuable in preparing fibers, film, etc. as described herein. It is a further object of this invention to provide 4,4'-bis-(β-hydroxyethyl)-biphenyl-bis-(alkyl or aryl carbonates) as monomeric starting materials for the preparation of the polycarbonates. An additional object of this invention resides in providing a process for converting the bis-(carbonate) monomer starting materials into the polycarbonates. Other objects will become apparent hereinafter.

Linear polycarbonates prepared by the condensation of p-xylylene glycol and m-xylylene glycol with an alkyl carbonate had been described by Carothers and his followers in the prior patented art as well as in Carothers' collected papers. Practically no subsequent work appears to have been performed in connection with the preparation of such linear polycarbonates. The materials prepared as described in Carothers' collected papers were of relatively low molecular weight and do not constitute highly polymeric linear crystalline polycarbonates which have high melting points, high intrinsic viscosities and which are useful in the formation of photographic film, fibers, threads, textile fabrics, electrical insulating materials, etc. The product obtained by Carothers is said to be a powder melting at less than 185° C. and having a molecular weight of not much more than 1,000. The products of the instant invention are highly polymeric polycarbonates which possess high intrinsic viscosity and high melting points such that they can be extruded to form films and the like which can be mechanically worked and heat-set to form molecularly oriented structures. According to Carothers, all of the polycarbonates described were prepared by alcoholysis between a glycol and ethyl carbonate in the presence of an alkaline catalyst, such as sodium, whereby vapors of an alcohol were driven off by heating.

One of Carothers' followers suggests that a trace of an aliphatic dibasic acid can be introduced into the reactants in Carothers' process whereby "super polycarbonates" can be produced by heat under a vacuum.

The prior art does not describe any satisfactory procedure which will produce linear highly polymeric polycarbonates having melting points of about 245° C. and having intrinsic viscosities of at least about 0.7 in a 60% phenol: 40% tetrachloroethane solution. The process of the instant invention represents a great improvement over that described in the prior art since it provides a simple, direct, easily reproducible process, and the polycarbonates obtainable have unexpectedly superior characteristics.

There are other regards in which the polycarbonates of this invention are superior to those described in the prior art. These include the percentage of elongation, tenacity, elastic recovery, work recovery, stress relaxation, tensile strength, resistance of films to tearing and to repeated folding, modulus of elasticity, electrical properties, etc. This invention is limited in scope to those particular bis-(carbonate) monomers disclosed since experiments demonstrate that only such compounds and a few others described in copending applications can be employed to produce highly polymeric linear polycarbonates of the type with which this invention is concerned.

The process of this invention for producing the novel polycarbonates comprises (A) self-condensing a bis-(carbonate) monomer having the following formula:

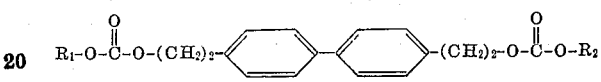

wherein $R_1$ and $R_2$ each represents a radical selected from the group consisting of lower alkyl radicals containing from 1 to 4 carbon atoms and aryl radicals of the benzene series containing from 6 to 8 carbon atoms, (B) in the presence of an ester-interchange catalyst containing titanium as the metallic element, which catalyst can be selected from the group consisting of $Ti(OR')_4$, $TiX_4$ and ether complexes of $TiX_4$ wherein the ether complexes are derived by reacting $TiX_4$ with an ether selected from the group consisting of aliphatic and alicyclic ethers containing from 2 to 12 carbon atoms, and wherein R' represents an alkyl radical containing from 1 to 18 carbon atoms and X represents a halogen atom, (C) at an elevated temperature, (D) the condensation being conducted in an inert atmosphere and (E) the latter part of the condensation being conducted at a very low pressure.

It can readily be seen from the description of the process that there is no problem involved in adjusting the ratio of carbonate constituent to glycol constituent in the reaction vessel since the polycarbonates are produced according to this invention by the self-condensation of only one starting material. This establishes the composition of the polycarbonate produced since there can be no variation in the proportion of carbonate and glycol constituents. Moreover, the nature of this process makes it admirably suited to conducting the process of a continuous basis since no problems are involved in maintaining critical proportions of reactants.

Examples of the starting materials, i. e. the bis-(carbonate) monomers which can be used in the process of this invention include 4,4'-bis-(β-hydroxyethyl)-biphenyl-bis-(ethyl carbonate), 4,4'-bis-(β-hydroxyethyl)-biphenyl-bis-(phenyl carbonate), 4,4'-bis(β-hyd.oxyethyl)-biphenyl-bis-(n-butyl carbonate), 4,4'-bis(β-hydroxyethyl)-biphenyl-bis-(isopropyl carbonate), 4,4'-bis(β-hydroxyethyl)-biphenyl-bis-(methyl carbonate), etc.

In carrying out the process of this invention, the ester-interchange catalysts which can be employed as condensing agents are extremely limited as indicated. It would perhaps appear that any of the well-recognized ester-interchange catalysts would be operative. However, this has not been found to be the case. Very unexpectedly, the applicants discovered that only certain compounds of titanium can be satisfactorily employed as catalysts to produce the polyesters of this invention. Other compounds, even including some compounds of titanium, which are well recognized ester-interchange catalysts promote the degradation of the starting material with the formation of ethylenic unsaturation and cross-linking. This aspect of the invention is discussed in greater detail hereinbelow.

The titanium catalysts described above can be advantageously employed in an amount of from about 0.005% to about 0.1% by weight based on the weight of the bis-(carbonate) monomer being condensed. Higher or lower percentages can also be employed.

The temperature at which the condensation is conducted depends upon whether the process is conducted in the solid phase or in the liquid phase. When either type of process is used, the temperature can be advantageously increased during the course of the condensation. Advantageously, the reaction can be considered as being conducted in two stages. The temperature to which the condensation reaction mixture is initially raised at the beginning of stage I is advantageously in excess of 200° C. Lower temperatures can also be employed although it is generally advantageous to use an initial temperature of at least about 200° C. Although it is convenient to consider the condensation process as being conducted in two separate stages, the actual condensation itself continues smoothly from stage I into stage II. The principle of distinction between the so-called two stages lies in the fact that during stage II, the pressure of the adjacent atmosphere under which the condensation is performed is greatly reduced. Although the temperature can remain the same for both the first and the second stage, it is advantageous to employ a somewhat higher temperature at about the same time the pressure is reduced, especially when the liquid phase process is being employed. The temperature used during the latter part of stage II can advantageously be at least 250° or higher; the maximum temperature which can be employed is determined by the tendency of the polycarbonate to decompose at extremely high temperatures. As a practical matter, it is most advantageous to employ a maximum temperature of not much more than about 250° C. When a solid phase process is employed, the maximum temperature can be restricted to much lower temperatures, although the time required to accomplish the production of desirable linear polymeric polycarbonates may be increased accordingly.

The reduced pressure which is employed during stage II of the condensation is advantageously less than about 15 mm. of Hg of pressure. Most advantageously, the pressure is about 0.5 mm. of Hg of pressure. Generally speaking, pressures are employed which are the lowest pressures obtainable by the employment of an efficient high-vacuum mechanical pump. Such pressures are generally in the range of less than 1 mm. of Hg pressure.

The time required for each of the two stages can advantageously be from about one half to 4 or 5 hours. Longer or shorter periods of time can also be employed.

The inert atmospheres which can be advantageously employed in the course of the condensation reaction include atmospheres of nitrogen, hydrogen, helium, carbon dioxide, etc.

It is generally advantageous to stir the condensation reaction mixture in order to maintain a reasonably even distribution of temperature throughout the reaction mixture and to otherwise facilitate the condensation. However, this is not essential especially when small quantities of bis-(carbonate) monomers are being condensed. During the course of the reaction, an alkyl ester or an aryl ester of carbonic acid will be evolved as a gas, as indicated hereinabove. Stirring facilitates the removal of this material in its gaseous form. Either as an aid to the stirring operation or in lieu thereof, the inert gas can be advantageously bubbled through the reaction mixture whereby the removal of the carbonic acid ester is also facilitated.

The various conditions described somewhat generally hereinabove in regard to the process of this invention can obviously be altered to suit the particular starting material being condensed and other conditions which are specific to the reaction being accomplished depending upon the particular set of circumstances. These variations are set forth to some extent in the examples below.

The products of this invention are linear highly polymeric crystalline polycarbonates having melting points of about 245° C., high intrinsic viscosities and containing the following repeating units:

wherein the units are connected by ester linkages. In this specification all intrinsic viscosities are measured by standard procedures employing solution in 60% phenol–40% sym. tetrachlorethane. The melting points of the polycarbonates described in the examples hereinbelow were all at least 240° C. and were generally from 245° to 250° C.

The bis-(carbonate) monomers of this invention have been found to possess certain qualities that can be improved upon by the formation of interpolycarbonates as described in our copending applications, Serial Numbers 407,804, 407,805, and 407,806 filed on February 2, 1954. Besides employing bis-(carbonate) monomers in the formation of interpolycarbonates, the polycarbonates of this invention can be mechanically admixed with other polycarbonates to form mixed polymers possessing average properties derived from the various components of the mixture. It is similarly obvious that both the unmodified polycarbonates and interpolycarbonates can be suitably blended or mixed with other polycarbonates, polyesters, polyurethanes, polyamides, polystyrenes, polyethylene, etc. insofar as the polycarbonates of this invention are compatible with such high polymers. The products which can be produced include waxes, fibers, molded articles, extrusion products, coating materials, etc.

The polycarbonates of this invention can be prepared by various continuous processes employing many types of apparatus known to be useful in conducting various related continuous processes as described in the prior art, for example, the method described in U. S. 2,647,885 can be suitably adapted. For another example reference is made to application, Serial Number 397,040 filed on even date herewith.

The bis-(carbonate) monomers employed in accordance with this invention can be prepared by condensing an alkyl or an aryl chlorocarbonate with 4,4-bis-(β-hydroxyethyl)-biphenyl in the presence of pyridine. Although it is advantageous to carry out this condensation in a tertiary amine such as pyridine, other acid-binding agents can also be employed. Advantageously, the reaction mixture can be cooled to prevent excessive increase in temperature. Advantageously, more than two mole proportions of alkyl or aryl chlorocarbonate or bromocarbonate are employed for each mole proportion of 4,4'-bis-(β-hydroxyethyl)-biphenyl. Upon suitable purification, the reaction mixture gives a good yield of a 4,4'-bis-(β-hydroxyethyl)-biphenyl-bis-(alkyl or aryl carbonate). Various modifications of this process can obviously be employed to produce the various bis-(carbonate) monomer starting materials.

The following example will serve to further illustrate how these bis-(carbonate) monomers can be prepared:

PREPARATION OF 4,4'-BIS (β-HYDROXYETHYL) BIPHENYL-BIS (ETHYL CARBONATE)

A. 4,4'-BIS (BROMOETHYL) BIPHENYL

In a 3 liter, three-necked flask, equipped with a mechanical stirrer, gas inlet tube and a reflux condenser sealed from moisture with a CaCl₂ tube, were placed: 600 g. biphenyl, 438 g. paraformaldehyde, 700 ml. glacial acetic acid, 300 ml. carbon tetrachloride. The reaction mixture in the form of a milky suspension was heated to reflux by a Glas-Col heater, and dry hydrogen bromide was passed in. Heat from the Glas-Col heater was reduced while hydrogen bromide was introduced, refluxing being maintained by the rapid rate of addition of the gas. The milky suspension disappeared early during the course of the reaction and the reaction mixture turned clear. Later, the 4,4'-bis (bromomethyl) biphenyl precipitated out. The total reaction time was 48 hours.

The reaction mixture was cooled, poured into acetone, and the solid was recrystallized from 12 l. of acetone to give white platelets. Yield=760 g.; M. P.=160–170°. A second recrystallization from acetone was necessary. Yield=430 g.; M. P.=169.5–171.5°.

While working up the product, a fluid, pasty mass was obtained. This has been identified as mainly monobromomethylbiphenyl which was contaminated with small amounts of impurities. This may be used in subsequent runs to give improved yields.

B. 4,4'-BIS (CYANOMETHYL) BIPHENYL

Into a 12 l. wide-mouthed flask equipped with a mechanical stirrer were placed: 800 g. sodium cyanide, 960 ml. distilled water, 1920 ml. ethyl alcohol, 2400 ml. dioxane. The reaction mixture was heated to boiling on a steam-pot; the steam heat was then turned off, and 1360 g. of 4,4'-bis (bromomethyl) biphenyl was added at a rate sufficient to maintain vigorous boiling. Water cooling of the flask may be employed in order to speed up the addition of the dibromo compound. After all of the 4,4'-bis-(bromomethyl) biphenyl has been added, the reaction mixture was heated for 20 minutes and then poured into water.

The precipitate was washed several times with water, filtering between washes, and dried. Yield=852 g. (92%). The product was recrystallized from ethyl acetate. Yield=77%; M. P. 185–187°.

C. 4,4'-BIS (CARBETHOXYMETHYL) BIPHENYL

In a 5 l. flask equipped with a mechanical stirrer, thermometer and gas inlet tube placed: 464 g. (2 moles) 4,4'-bis (cyanomethyl) biphenyl, 3 l. absolute ethyl alcohol. Dry hydrogen chloride was passed into the reaction mixture, the temperature being maintained between 28–30° C. by means of external water cooling. After 2 hours, the reaction mixture was in the form of a solution. The cooling water was then shut off and product began to separate out. After a total of 4½ hours treatment with hydrogen chloride, the gas was turned off and the reaction mixture was allowed to stand over night. The solid product was filtered, washed with ether, and dried at 50° C. Yield 640 g. (60.5%).

The imino ether hydrochloride was placed in a 12 l. flask containing 6 l. of water and heated on a steam bath for 2 hours. The imino-ether hydrochloride went into solution rapidly and the ester crystallized.

The reaction mixture was cooled to room temperature and the ester was filtered, washed with water, and dried at 50° C.

The ester was recrystallized from ligroin (60–90°). M. P.=56.5°; yield=90%.

D. 4,4'-BIS (CARBETHOXYMETHYL) BIPHENYL

In a 500 ml. flask equipped with a reflux condenser were placed: 26 g. 4,4'-bis(cyanomethyl) biphenyl, 102 ml. absolute ethanol, 40 ml. concentrated sulfuric acid. The reaction mixture was refluxed for 24 hours, after which 2 layers were present, was chilled to give a white precipitate, which was given several washes with water filtered, and dried at 50°. The ester was recrystallized from ligroin (60–90°). Yield=28 g. (77%); M. P.=54–56°.

E. 4,4'-BIS-(β-HYDROXYETHYL) BIPHENYL

One liter of anhydrous ether and 96 g. (2.52 moles) of lithium aluminum hydride were placed in a 12 l. flask equipped with a mechanical stirrer, an efficient reflux condenser, and a mechanical metering pump. A solution of 652 g. (2 moles) of 4,4'-bis(carbethoxymethyl) biphenyl in 4 l. of anhydrous ether was added, to the stirred solution via the metering pump, during a 1.5 hour period. The rate of addition was just sufficient to maintain vigorous refluxing. After the addition was completed, the reaction mixture was stirred for 3 hours without external heating. Ethyl acetate (200 ml.) followed by distilled water (350 ml.) was added to the reaction mixture. After the complex had been decomposed, the precipitate was filtered and extracted with hot dioxane. The extracts were combined with the ether filtrate and concentrated to dryness under vacuum. The product was crystallized from ethanol. Yield 82%; M. P. 187.5–189° C.

F. 4,4'-BIS (β-HYDROXYETHYL) BIPHENYL-BIS-(ETHYL CARBONATE)

A mixture of 400 g. 4,4'-bis (β-hydroxyethyl) biphenyl and 1600 ml. of pyridine was cooled to 20° C. in a 5 l. flask equipped with a mechanical stirrer, a thermometer and a dropping funnel. The mixture was stirred and 400 g. ethyl chlorocarbonate was added dropwise. The temperature was maintained at 20–25° C. After 2 hours at 25° C., the reaction mixture was poured into cold water and the product separated by filtration. It was washed with water and dried at 50° C. After recrystallizing from ligroin (60–90° C.), it melted at 80.5–82° C.

G. 4,4'-BIS-(β-HYDROXYETHYL)-BIPHENYL-BIS-(PHENYL CARBONATE)

The procedure described above was repeated except that phenyl chlorocarbonate was employed in lieu of the ethyl chlorocarbonate.

H. 4,4'-BIS-(β-HYDROXYETHYL)-BIPHENYL-BIS-(PENTYL CARBONATE)

The procedure described above was repeated except that pentyl bromocarbonate was employed.

It is believed readily apparent that other corresponding bis-carbonate monomers can be prepared employing alkyl or aryl chlorocarbonates wherein the alkyl radicals contain from 1 to 8 carbon atoms and the aryl radicals are members of the benzene series containing from 6 to 8 carbon atoms.

The bis-(carbonate) monomers, prepared as described above, can be employed in accordance with the following examples which serve to further illustrate this invention as regards the polycarbonates and their preparation:

*Example 1.—Polycarbonate employing titanium butoxide as catalyst*

A quantity of fifty grams of 4,4'-bis-(β-hydroxyethyl)-biphenyl-bis-(ethyl carbonate) was prepared as described above and 10 drops of titanium butoxide in 15 cc. n-butanol was added. The mixture was then heated in an atmosphere of nitrogen at 250° C. for two hours (stage I). The resulting product was stirred and heated at 260° in vacuum (0.4 mm.) for an additional 2.5 hours (stage II). The resulting viscous clear dope crystallized with extreme rapidity to give a white porcelain-like product; M. P. 250° C.; viscosity 0.73.

*Example 2.—Polycarbonate employing titanium butoxide as catalyst*

Two hundred grams of 4,4'-bis(β-hydroxyethyl)-biphenyl-bis-(phenyl carbonate) was melted, and eleven drops of titanium butoxide was added. The reaction mixture was heated under an atmosphere of nitrogen for an hour and twenty minutes in an oil bath at 200–240° C. (stage I). During this period the phenyl carbonate which formed was distilled from the reaction flask. The reaction mass was then stirred at 0.5 mm. Hg pressure for three hours and forty minutes while being heated in a 255° C. oil bath (stage II). Upon cooling, a white crystalline porcelain-like product was obtained. The intrinsic viscosity as measured in a 60:40 phenol:tetrachloroethane mixture was 0.79; M. P. 245° C.

Example 3.—Polycarbonate employing titanium butoxide as catalyst

Ten grams of 4,4'-bis(β-hydroxyethyl)-biphenyl-bis-(ethyl carbonate) was heated under nitrogen at 200° C. with two drops of titanium butoxide. After forty-five minutes, the oil bath temperature was raised to 275° C. and a vacuum pump was attached to the reaction tube. After thirty minutes, the clear, viscous product was removed from the oil bath. It crystallized very rapidly to a white porcelain-like material. Its intrinsic viscosity in a 60:40 phenol:s-tetrachloroethane mixture was 0.70. Its melting point was 245° C.

Example 4.—Polycarbonate employing titanium butoxide as catalyst

Two hundred grams 4,4' - bis - (β-hydroxyethyl)-biphenyl-bis-(butyl carbonate) was placed in a 500 cc. flask equipped with a ground glass neck and a side arm. Ten drops of titanium butoxide was added and the reaction mixture was melted in a 260° oil bath. Hydrogen was bubbled through the reaction mixture during stage I. Dibutyl carbonate was removed by distillation. After one hour and thirty minutes, a stirrer assembly was inserted, and the reaction mixture stirred under 0.3 mm. pressure for 3.5 hours. The resulting polymer crystallized rapidly when cooled. It was a hard, white porcelain-like product with an intrinsic viscosity of 0.75. The viscosity was measured in a 60:40 phenol:tetrachloroethane mixture.

The catalysts employed in accordance with the instant invention result in the production of polycarbonates which have the advantageous properties described hereinabove, whereas many of the other better known ester-interchange catalysts result in the production of polycarbonates which have a low molecular weight and are insoluble products of inferior properties. Such inferior products result when sodium is employed as the catalyst, as well as when other presumably efficient ester-interchange catalysts are employed. For example, lithium aluminum ethylate is known to be an efficacious ester-interchange catalyst; however, it has not been found to be satisfactory in preparation of the products of this invention. Moreover, some bimetallic titanium catalysts such as sodium hydrogen titanium butoxide are also unsatisfactory. It appears that these unsatisfactory catalysts produce unsaturation within the molecule whereby olefinic character such as in styrene is created. As a result, the polymers produced are not linear in structure but are cross-linked and of no value for fibers, film, and the like, where molecular orientation is desired.

It would appear that the structure existing in the bis-(carbonate) monomer is unstable and decomposes in the presence of most ester-interchange catalysts to yield various undesirable products.

This situation demonstrates the unusual advantages of employing the titanium catalysts covered by the applicants' invention. Several of the preceding examples illustrate the employment of titanium butoxide as the catalyst. This compound and many of its homologs are thick liquids. One drop weighs about 0.015 gram and contains about 0.0002 equivalents of titanium. It is sometimes advantageous to dissolve these liquids in an alcohol to facilitate handling the catalyst.

Another titanium compound which has been found to be useful is titanium tetrachloride. Titanium tetrachloride is difficult to handle because of its rapid reaction with the moisture in the air. It has therefore, been found advantageous to employ this compound in the form of an ether complex. In preparing these complexes, the lower aliphatic ethers containing from 2 to 8 carbon atoms on either side of the central oxygen atom and the cyclic ethers such as 1,4 dioxane can be employed. The ether complexes are prepared advantageously by adding titanium tetrachloride slowly to an excess of the ether. It is advantageous to maintain the ether at ambient temperatures (20°–30° C.) or lower during this addition. Examples regarding the preparation of these ether complexes are presented below:

Example 5.—Ether 1,4-dioxane complex with $TiCl_4$

Titanium tetrachloride was added slowly to an excess of 1,4-dioxane. The yellow precipitate which formed was filtered and dried in a vacuum desiccator over $P_2O_5$. As such, it could be conveniently used as a catalyst.

Example 6.—Diethyl ether complex of $TiCl_4$

Titanium tetrachloride was added slowly to an excess of diethyl ether which was cooled in an acetone-Dry Ice bath. The solid which precipitated was separated and dried in a vacuum desiccator over $P_2O_5$.

This was used as a catalyst as illustrated in Example 7 which serves to further illustrate our invention.

Example 7.—Polycarbonate employing diethyl ether complex of $TiCl_4$ as catalyst A ten-gram sample of 4,4'-bis-(β-hydroxyethyl)-biphenyl-bis-(ethyl carbonate) was heated under nitrogen with 0.1 gm. of the ether complex (Example 6) for twenty-five minutes at 250° C. The catalyst dissolved immediately and diethyl carbonate began to distill within about three minutes. After the initial twenty-five minute stage the reaction mixture was stirred under vacuum for one hour and forty-five minutes (stage II). The product was similar to that described in Example 8.

Example 8.—Polycarbonate employing $TiCl_4$ as catalyst

Fifty grams of 4,4'-bis-(β-hydroxyethyl)-biphenyl-bis (ethyl carbonate) was heated with six drops of titanium tetrachloride, under nitrogen, for one hour in an oil bath maintained at 250° C. The resulting product was then stirred under 0.2 mm. pressure for an additional 2.25 hours at 250° C. The resulting clear, viscous melt crystallized rapidly upon cooling to yield a dense, hard, white porcelain-like product. It was soluble in 60:40 phenol:tetrachloroethane at 110° C. and had an intrinsic viscosity of 0.71.

Example 9.—Polycarbonate employing $TiBr_4$ as catalyst

The process described in Example 7 was repeated exactly except that $TiBr_4$ was employed as the catalyst. The polymer obtained was essentially the same as in Example 7; it had a melting point of 245° C.

Example 10.—Polycarbonate employing $Ti(OC_{11}H_{23})_4$ as catalyst

The process described in Example 1 was repeated except that $Ti(OC_{11}H_{23})_4$ was employed as the catalyst. The polymer obtained was essentially the same as in Example 1 except for a somewhat lower melting point of 245° C.

It is believed that the preceding examples make it clearly apparent that the specified titanium catalysts are essential to the preparation of linear highly polymeric crystalline polycarbonates when self-condensing the bis-(carbonate) monomers of this invention. Other catalysts such as the alkali metal and the alkaline earth metal alkoxides are strikingly inferior to these titanium compounds.

The polycarbonates of this invention can be prepared employing other catalysts and other reaction conditions in a manner analogous to that described in the preceding examples within the scope of the ranges and limits set forth hereinbefore.

The products can be produced either batchwise or continuously, and can be used alone or admixed with similar or dissimilar polymeric materials or polymeric compounding agents in accordance with usual practices. The products can be used for making fibers, for extruding or molding, or for making films and sheets which can be used as film supports for black and white or color photographic film or the like.

The photographic films which can be produced can advantageously comprise a film support of the above-described polycarbonates upon which is deposited one or more layers of a silver halide emulsion which can contain appropriate sensitizers or other additives to suit the intended photographic use.

We claim:

1. A process for preparing a highly polymeric linear polycarbonate comprising (A) self-condensing a bis-(carbonate) monomer having the following formula:

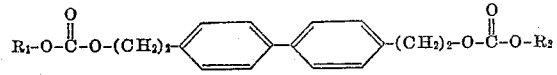

wherein $R_1$ and $R_2$ each represents a radical selected from the group consisting of lower alkyl radicals containing from 1 to 4 carbon atoms and aryl radicals of the benzene series containing from 6 to 8 carbon atoms, (B) in the presence of an ester-interchange catalyst containing titanium as the metallic element, which catalyst is selected from the group consisting of $Ti(OR')_4$, $TiX_4$ and ether complexes of $TiX_4$ wherein the ether complexes are derived by reacting $TiX_4$ with an ether selected from the group consisting of aliphatic and alicyclic ethers containing from 2 to 12 carbon atoms, and wherein $R'$ represents an alkyl radical containing from 1 to 18 carbon atoms and X represents a halogen atom, (C) at an elevated temperature, (D) the condensation being conducted in an inert atmosphere and (E) the latter part of the condensation being conducted at a very low pressure.

2. A process as defined in claim 1 wherein the elevated temperature during the course of the condensation is in excess of about 200° C.

3. A process as defined in claim 2 wherein the ester-interchange catalyst is employed in an amount of from about 0.005% to about 0.2% based on the weight of the bis (carbonate) monomer.

4. A process as defined in claim 3 wherein the low pressure is less than about 15 mm. of Hg pressure.

5. A process as defined in claim 4 wherein the bis-(carbonate)monomer is 4,4'-bis-(β-hydroxyethyl)-biphenyl-bis-(ethyl carbonate).

6. A linear highly polymeric polycarbonate having an intrinsic viscosity of at least 0.7 measured in a solution of 60 volumes of phenol and 40 volumes of tetrachloroethane, a melting point above about 245° C. which is composed of the following repeating units:

wherein the units are connected by ester linkages and one end of each polymer molecule contains an $R_1$ radical attached to the terminal free oxygen bond and the other end of each polymer molecule contains an

radical attached to the terminal free methylene bond, wherein $R_1$ and $R_2$ each represents a radical selected from the group consisting of lower alkyl radicals containing from 1 to 4 carbon atoms and aryl radicals of the benzene series containing from 6 to 8 carbon atoms.

7. 4,4' - bis - (β - hydroxyethyl) - biphenyl - bis- (ethyl carbonate).

8. A process as defined in claim 3 wherein the catalyst is titanium butoxide.

9. A process as defined in claim 3 wherein the catalyst is the diethyl ether complex of titanium tetrachloride.

10. A process as defined in claim 3 wherein the catalyst is titanium tetrachloride.

11. A process as defined in claim 3 wherein the catalyst is the 1,4-dioxane complex of titanium tetrachloride.

12. A process as defined in claim 3 wherein the catalyst is titanium tetrabromide.

13. A compound having the following formula:

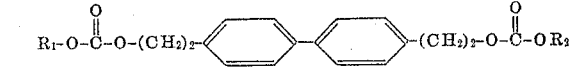

wherein $R_1$ and $R_2$ each represents a radical selected from the group consisting of lower alkyl radicals and aryl radicals of the benzene series containing from 6 to 8 carbon atoms.

14. 4,4' - bis - (β - hydroxyethyl) - biphenyl - bis- (isopropyl carbonate).

15. 4,4' - bis - (β - hydroxyethyl) - biphenyl - bis- (phenyl carbonate).

16. 4,4' - bis - (β - hydroxyethyl) - biphenyl - bis- (butyl carbonate).

17. 4,4' - bis - (β - hydroxyethyl) - biphenyl - bis- (pentyl carbonate).

References Cited in the file of this patent
UNITED STATES PATENTS

| 2,210,817 | Peterson | Aug. 6, 1940 |
| 2,379,252 | Muskat et al. | June 26, 1945 |
| 2,468,975 | Held et al. | May 3, 1949 |